(12) United States Patent
Koenig (10) Patent No.: US 11,577,563 B2
(45) Date of Patent: Feb. 14, 2023

(54) INSTALLATION UNIT WITH LATCHING ELEMENTS FOR CARRIER UNIT MOUNTED ON A MOTOR VEHICLE

(71) Applicant: ACPS Automotive GmbH, Ingersheim (DE)

(72) Inventor: Ferdinand Koenig, Ludwigsburg (DE)

(73) Assignee: ACPS Automotive GmbH, Ingersheim (DE)

( * ) Notice: Subject to any disclaimer, the term of this patent is extended or adjusted under 35 U.S.C. 154(b) by 185 days.

(21) Appl. No.: 17/094,137

(22) Filed: Nov. 10, 2020

(65) Prior Publication Data

US 2021/0138857 A1 May 13, 2021

(30) Foreign Application Priority Data

Nov. 11, 2019 (DE) .......................... 102019130312.5

(51) Int. Cl.
*B60D 1/54* (2006.01)
*B60D 1/06* (2006.01)
*B60D 1/42* (2006.01)

(52) U.S. Cl.
CPC ................. *B60D 1/54* (2013.01); *B60D 1/06* (2013.01); *B60D 1/42* (2013.01)

(58) Field of Classification Search
CPC ............................ B60D 1/54; B60D 2001/544
See application file for complete search history.

(56) References Cited

U.S. PATENT DOCUMENTS 9,744,822 B2 * 8/2017 Burkhardt .............. B60D 1/485
2015/0352915 A1 12/2015 Burkhardt et al.
2021/0129606 A1 * 5/2021 Kadnikov ................ B60D 1/06

FOREIGN PATENT DOCUMENTS

EP            2952368 A2    12/2015

* cited by examiner

*Primary Examiner* — Kevin Hurley
(74) *Attorney, Agent, or Firm* — Reinhart Boerner Van Deuren P.C.

(57) ABSTRACT

In order to improve an installation unit for a carrier unit that is mounted on a body of a motor vehicle, comprising a housing having a first housing portion that is supported on one side of the carrier unit, a second housing portion that passes through a receptacle in the carrier unit, and a mounting body that is opposite the first housing portion and is supported on the carrier unit on a side remote from the first housing portion and, when the installation unit is mounted on the carrier unit, is fixed by latching elements, wherein the mounting body has a base body to which the second latching elements are connected, and the mounting body cooperates with support elements that are supported against the carrier unit, in such a way that the connection between the latching elements is on the one hand stable over the long term and on the other can be released easily, it proposed that the second latching elements should be connected to the base body by latching element carriers, and that the latching element carriers should have, on a side facing the second housing portion, pressure faces by way of which the latching element carriers are configured to be urged such that the second latching elements are disengaged from the first latching elements provided on the second housing portion.

34 Claims, 12 Drawing Sheets

FIG.11

INSTALLATION UNIT WITH LATCHING ELEMENTS FOR CARRIER UNIT MOUNTED ON A MOTOR VEHICLE

CROSS-REFERENCE TO RELATED PATENT APPLICATION

This patent application claims the benefit of German application No. 10 2019 130 312.5, filed Nov. 11, 2019, the teachings and disclosure of which are hereby incorporated in their entirety by reference thereto.

BACKGROUND OF THE INVENTION

The invention relates to an installation unit for a carrier unit that is mounted on a body of a motor vehicle, comprising a housing having a first housing portion that is supported on one side of the carrier unit, a second housing portion that passes through a receptacle in the carrier unit, and a mounting body that is opposite the first housing portion and is supported on the carrier unit on a side remote from the first housing portion and, when the installation unit is mounted on the carrier unit, is fixed to the second housing portion by first latching elements arranged on the second housing portion and second latching elements arranged on the mounting body, wherein the mounting body has a base body to which the second latching elements are connected, and the mounting body cooperates with support elements that are supported against the carrier unit.

Installation units of this kind are known from the prior art, for example EP 2 952 368 A2.

Taking this prior art as a starting point, the object of the invention is to provide an installation unit in which the connection between the latching elements is on the one hand stable over the long term and on the other can be released easily.

SUMMARY OF THE INVENTION

According to the invention, this object is achieved in the case of an installation unit of the type mentioned in the introduction in that the second latching elements are connected to the base body by latching element carriers, and in that the latching element carriers have, on a side facing the second housing portion, pressure faces by way of which the latching element carriers are configured to be urged such that the second latching elements are disengaged from the first latching elements provided on the second housing portion.

This solution provides a simple way of disengaging the latching elements by acting on the pressure faces, in order to enable the mounting body to be released from the housing, in particular the second housing portion, in a simple manner.

Here, it is particularly favorable if, as the pressure faces extend in the direction of the second latching elements, they extend on the latching element carriers from their ends facing the base body increasingly in the direction of the first latching elements of the second housing portion—that is to say that the pressure faces come closer to the first latching elements of the second housing portion.

In particular, this can be achieved in that, in the region of the ends of the latching element carriers, the pressure faces are at a spacing from the second housing and/or the first latching elements thereof that lessens as the latching element carriers extend further in the direction of the second latching elements.

The course of the pressure faces may be conical, or the course may be curved, wherein in each case the spacing between the pressure faces and the first latching elements is smaller close to the second latching elements than in the region of the ends of the latching element carriers facing the base body.

It is particularly advantageous if the pressure faces delimit a recess formed in the respective latching element carrier, that is to say that the pressure faces represent for example a base of a recess formed in the respective latching element carrier, wherein the base is arranged in particular opposite an open side of the recess facing the first latching elements.

Further, for the purpose of actuating the latching element carriers by way of the pressure faces, it is favorable if the pressure faces are accessible from the base body side by way of access openings provided in the base body, such that it is possible to act on the pressure faces by way of the access openings.

This can be achieved particularly favorably if the respective recesses are accessible by way of the access openings.

For the purpose of releasing the latching connection, it is particularly favorable if the pressure faces of the latching element carriers are urged by release fingers acting on the pressure faces such that the latching element carriers move the second latching elements into a release position that is no longer latched to the first latching elements.

In this way, it is possible to release the latching connection in a simple manner without impairing the quality of the latching connection between the first latching elements and the second latching elements that exists in the absence of action on the release fingers.

In particular, the release fingers act such that the release fingers are introduced into the recesses through the access openings.

In principle, it would be conceivable to use a multiplicity of release fingers in order to urge the pressure faces of all the latching element carriers, in order to move these latching element carriers into the release position.

Here, a particularly advantageous solution provides for the pressure faces to be urged by release fingers arranged on a release tool, for the purpose of releasing the latching connection.

Here, it is particularly favorable if the number of release fingers on the release tool corresponds to the number of latching element carriers provided with pressure faces, with the result that it is possible to urge all the latching element carriers with their pressure faces at the same time in order to release the mounting body from the housing.

More detailed statements have not yet been made as regards the form taken by the latching elements.

For example, an advantageous solution provides for the second latching elements to take the form of latching hooks or latching indentations that cooperate with first latching elements that are arranged on the second housing portion and take the form of latching indentations or latching hooks.

Further, it is preferably provided for the latching element carriers to connect the latching elements to the base body in a resiliently movable manner, so that, as a result of the resilient movability of the latching element carriers, movement of the second latching elements in relation to the first latching elements is implementable.

In particular in this case, the latching element carriers take a form such that they are resiliently deformable.

Further, it is preferably provided for the latching element carriers to urge the second latching elements such that these are held in engagement with the first latching elements as a result of the resilient force action of the latching element carriers when the latching connection is active.

This means that the latching element carriers take a form such that, when the second latching elements cooperate with the first latching elements, the latching element carriers continue to develop a resilient force action on the second latching elements in such a way that the second latching elements remain in engagement with the first latching elements, under force load.

More detailed statements have not yet been made as regards the form taken by the base body itself.

For example, an advantageous solution provides for the base body to be a body that runs completely around a center axis of the second housing portion.

In this case, it is favorably provided for the base body to take the form, at least in part, of an annular body, of which the annular body ends are connected to one another by a bridge.

In this case, it is possible in particular for the bridge to form a feed-through for a line that leads into the second housing segment, wherein, as a result of the bridge, on the one hand the line can advantageously be guided into the second housing segment and moreover can be held in contact with the carrier unit.

More detailed statements have not been made, in the context of the above description of the solution according to the invention, as regards the form taken by the support elements.

For example, an advantageous solution provides for the mounting unit to be supported against an opposite side of the carrier unit to the first housing portion by means of the support elements.

Support of this kind has the advantage that in this way, in the condition mounted on the carrier unit, the installation unit is supported on the one hand against a side of the carrier unit having the first housing portion, and against the opposite side of the carrier unit having the mounting unit by means of the support elements.

In this case, the support elements are supported against the carrier unit in particular at a side face of the carrier unit outside the receptacle.

Similarly, the installation unit is favorably also supported with the first housing portion against a side face of the carrier unit outside the receptacle.

More detailed statements have likewise not yet been made as regards the form taken by the support elements.

For example, it is preferably provided for the support elements to have supporting feet that are connected to the base body by means of resiliently deformable supporting foot carriers.

This provides the possibility of being able to adapt to variations in the geometric dimensions of the carrier unit by means of the resiliently deformed supporting foot carriers.

Preferably in this case, the supporting foot carriers take a form such that they extend in an arc shape from the base body to the supporting feet.

Further, the support elements preferably take a form such that they are arranged to succeed one another in a plane running parallel to the side face provided on the carrier unit but are formed to be resiliently movable in relation to one another.

This has the advantage that the different support elements that are resiliently movable in relation to one another can adapt even better to variations in the geometric dimensions of both the carrier unit and also the installation unit.

In particular, the support elements take a form such that, when the installation unit is mounted, the mounting unit is pushed onto the second housing portion and immobilized by the latching connection to such an extent that the support elements are resiliently deformed, with the result that, as a result of the resilient deformation of the support elements, these clamp the carrier unit between the mounting body and the first housing portion, and thus fix the installation unit with positive locking and force locking in a manner preventing movement relative to the carrier unit.

It is particularly favorable if the installation unit serves to receive electrical components.

For this reason, it is preferably provided for an electrical line to be introduced into the second housing portion from the side thereof remote from the first housing portion.

Further, it is preferably provided for the second housing portion to be closed on its side remote from the first housing portion by a cover, wherein in particular the electrical line is guided through the cover.

Purely in theory, the cover and the mounting unit could be joined to form a single part.

However, it is particularly favorable if the cover and the mounting unit are separate parts.

In this case, it would still be possible for the cover to be held against the mounting unit.

However, it is particularly advantageous if the cover is fixed to the second housing portion such that a housing interior can be closed off by the housing portions and the cover regardless of the position of the mounting unit.

In this case, it is possible for the mounting unit to take a form surrounding the cover and thus, in its condition fixing the housing and connected to the second housing portion by the latching elements, to surround not only an end region of the second housing portion but also a sub-region of the cover that adjoins this end region.

A particularly advantageous solution provides for the cover to have an outer face against which the release fingers are supported during action on the pressure faces, with the result that support of the release fingers need not be by the second housing portion but is, rather, by the cover and it is thus possible to arrange the first latching elements directly in the end region of the first housing portion.

As regards the form taken by the installation unit, the most diverse solutions are conceivable.

An advantageous solution provides for the installation unit to be formed for the purpose of receiving a plug connector element.

Another advantageous solution provides for the installation unit to be formed for the purpose of receiving an electronic circuit.

A further solution provides for the installation unit to be formed for the purpose of receiving sensors.

Moreover, the invention relates to a carrier unit for mounting on a body of a motor vehicle, which is provided with an installation unit according to one of the preceding claims.

Further, more detailed statements have not yet been made as regards the form taken by the carrier unit.

For example, each element of the carrier unit could be provided with the receptacle for the installation unit.

A particularly favorable solution provides for the carrier unit to comprise a coupling element for a trailer and/or a coupling element for a load carrier that is provided with the receptacle.

It is particularly favorable if the coupling element extends away from a tail side of the motor vehicle.

In this case, the coupling element may either be detachably connected to the other components of the carrier unit, or be connected to the other components of the carrier unit such that it is pivotal between an operative position and a rest position.

Thus, the description above of solutions according to the invention comprises in particular the different combinations of features that are set forth in paragraphs below.

One aspect is directed toward an installation unit for a carrier unit (20) that is mounted on a body (12) of a motor vehicle (10), comprising a housing (102) having a first housing portion (104) that is supported on one side of the carrier unit (20), a second housing portion (106) that passes through a receptacle (72) in the carrier unit (20), and a mounting body (130) that is opposite the first housing portion (104) and is supported on the carrier unit (20) on a side (74) remote from the first housing portion (104) and, when the installation unit (100) is mounted on the carrier unit (20), is fixed to the second housing portion (106) by first latching elements (126) arranged on the second housing portion (106) and second latching elements (146) arranged on the mounting body (130), wherein the mounting body (130) has a base body (132) to which the second latching elements (146) are connected, and the mounting body (130) cooperates with support elements (170) that are supported against the carrier unit (20), wherein the second latching elements (146) are connected to the base body (132) by latching element carriers (136), and the latching element carriers (136) have, on a side facing the second housing portion (106), pressure faces (152) by way of which the latching element carriers (136) are configured to be urged such that the second latching elements (146) are disengaged from the first latching elements (126) provided on the second housing portion (106).

The above aspect may have a feature wherein, as the pressure faces (152) extend in the direction of the second latching elements (146), they extend on the latching element carriers (136) from their ends (138) facing the base body (132) increasingly in the direction of the first latching elements (126) of the second housing portion (106).

The immediately above feature may have a further feature wherein the pressure faces (152) delimit a recess (156) formed in the respective latching element carrier (136).

The above aspect (which may also include any feature(s) above) may have a further feature wherein the pressure faces (152) are accessible from the base body (132) side by way of access openings (162) provided in the base body (132).

The immediately above feature may have a further feature wherein the respective recesses (156) are accessible by way of the access openings (162).

The above aspect (which may also include any feature(s) above) may have a further feature wherein, for the purpose of releasing the latching connection, the pressure faces (152) of the latching element carriers (136) are urged by release fingers (204) acting on the pressure faces (152) such that the latching element carriers (136) move the second latching elements (142) into a release position that is no longer latched to the first latching elements (126).

The immediately above feature may have a further feature wherein the release fingers (204) are introduced into the recesses (156) through the access openings (162).

The above aspect (which may also include any feature(s) above) may have a further feature wherein the pressure faces (152) are urged by release fingers (204) arranged on a release tool (200), for the purpose of releasing the latching connection.

The immediately above feature may have a further feature wherein the number of release fingers (204) on the release tool (200) corresponds to the number of latching element carriers (136) provided with pressure faces (152).

The above aspect (which may also include any feature(s) above) may have a further feature wherein the second latching elements (146) take the form of latching hooks or latching indentations that cooperate with first latching elements (126) that are arranged on the second housing portion (106) and take the form of latching indentations or latching hooks.

The above aspect (which may also include any feature(s) above) may have a further feature wherein the latching element carriers (136) connect the latching elements (146) to the base body (132) in a resiliently movable manner.

The immediately above feature may have a further feature wherein the latching element carriers (136) urge the second latching elements (146) such that these are held in engagement with the first latching elements (126) as a result of the resilient force action of the latching element carriers (136) when the latching connection is active.

The above aspect (which may also include any feature(s) above) may have a further feature wherein the base body (132) is a body that runs completely around a center axis (78) of the second housing portion (106).

The immediately above feature may have a further feature wherein the base body (132) takes the form, at least in part, of an annular body, of which the annular body ends are connected to one another by a bridge (194).

The feature of either of the preceding two paragraphs may have a further feature wherein the bridge (194) forms a feed-through (192) for a line that leads into the second housing segment (106).

The above aspect (which may also include any feature(s) above) may have a further feature wherein the mounting unit (130) is supported against an opposite side (76) of the carrier unit (20) to the first housing portion (104) by means of the support elements (170).

The immediately above feature may have a further feature wherein the support elements (170) are supported against a side face (76) of the carrier unit (20) outside the receptacle (72).

The above aspect (which may also include any feature(s) above) may have a further feature wherein the support elements (170) have supporting feet (174) that are connected to the base body (132) by means of resiliently deformable supporting foot carriers (172).

The immediately above feature may have a further feature wherein the supporting foot carriers (172) extend in an arc shape from the base body (132) to the supporting feet (174).

The feature of either of the preceding two paragraphs may have a further feature wherein the support elements (170) take a form such that they are arranged to succeed one another in a plane running parallel to the side face (76) provided on the carrier unit (20) but are formed to be resiliently movable in relation to one another.

The immediately above feature may have a further feature wherein the support elements (170) take the form of arc segments arranged to succeed one another in the plane parallel to the side face (76).

The above aspect (which may also include any feature(s) above) may have a further feature wherein an electrical line is introduced into the second housing portion (106) from the side thereof remote from the first housing portion (104).

The above aspect (which may also include any feature(s) above) may have a further feature wherein the second housing portion (106) is closed on its side remote from the first housing portion (104) by a cover (180).

The immediately above feature may have a further feature wherein the cover (180) and the mounting unit (130) are separate parts.

The immediately above feature may have a further feature wherein the cover (180) is fixed to the second housing portion (106).

The immediately above feature may have a further feature wherein the mounting unit (130) takes a form surrounding the cover (180).

The above aspect (which may also include any feature(s) above) may have a further feature wherein the cover (180) has an outer face (212) against which the release fingers (204) are supported during action on the pressure faces (152).

The above aspect (which may also include any feature(s) above) may have a further feature wherein the installation unit (100) is formed for the purpose of receiving a plug connector element (112).

The above aspect (which may also include any feature(s) above) may have a further feature wherein the installation unit (100) is formed for the purpose of receiving an electronic circuit.

The above aspect (which may also include any feature(s) above) may have a further feature wherein the installation unit (100) is formed for the purpose of receiving sensors.

Another aspect is directed toward a carrier unit for mounting on a body (12) of a motor vehicle (10), wherein the carrier unit (20) is provided with an installation unit (100) according the above aspect (which may also include any feature(s) above).

The above carrier unit aspect (which may also include any feature(s) above) may have a further feature wherein the carrier unit (20) comprises a coupling element (40) for a trailer and/or a coupling element (40) for a load carrier that is provided with the receptacle (72).

The immediately above feature may have a further feature wherein the coupling element (40) extends away from a tail side (14) of the motor vehicle (10).

The feature of either of the preceding two paragraphs may have a further feature wherein the coupling element (40) is provided with an installation unit (100) according to one of the preceding embodiments.

Further features and advantages of the invention form the subject matter of the description below of some exemplary embodiments, and their illustration in the drawing.

DETAILED DESCRIPTION OF THE INVENTION

Figure 1:
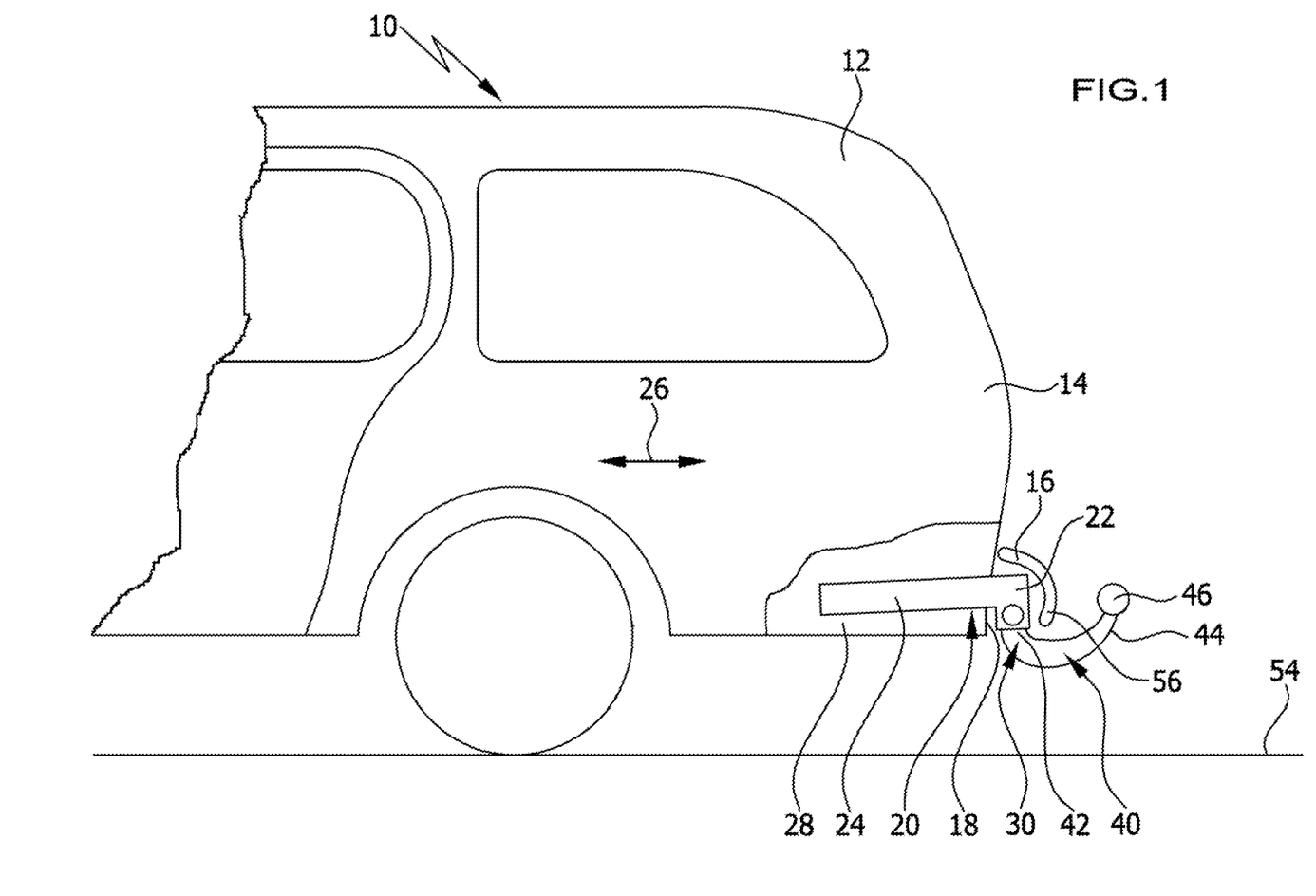
FIG. 1 shows a side view of a motor vehicle having a carrier unit according to the invention.

A motor vehicle that is illustrated in FIG. 1 and is designated 10 as a whole comprises a body 12, which carries a bumper unit 16 on a tail region 14.

On a rear side 18 of the tall region 14 that is covered by the bumper unit 16, there is provided a transverse carrier 22 of a carrier unit that is designated 20 as a whole, wherein the transverse carrier 22 is fixed to the tail region of the body 12 by lateral carriers 24—for example being fixed in that the lateral carriers 24 extend parallel to a longitudinal direction 26 of the body 12 and are fixed to the tail region 14 in side regions 28 thereof.

In this arrangement, the transverse carrier 22 is arranged between the rear side 18 of the tail region 14 and the bumper unit 16, and is covered by the bumper unit 16.

Figure 2:
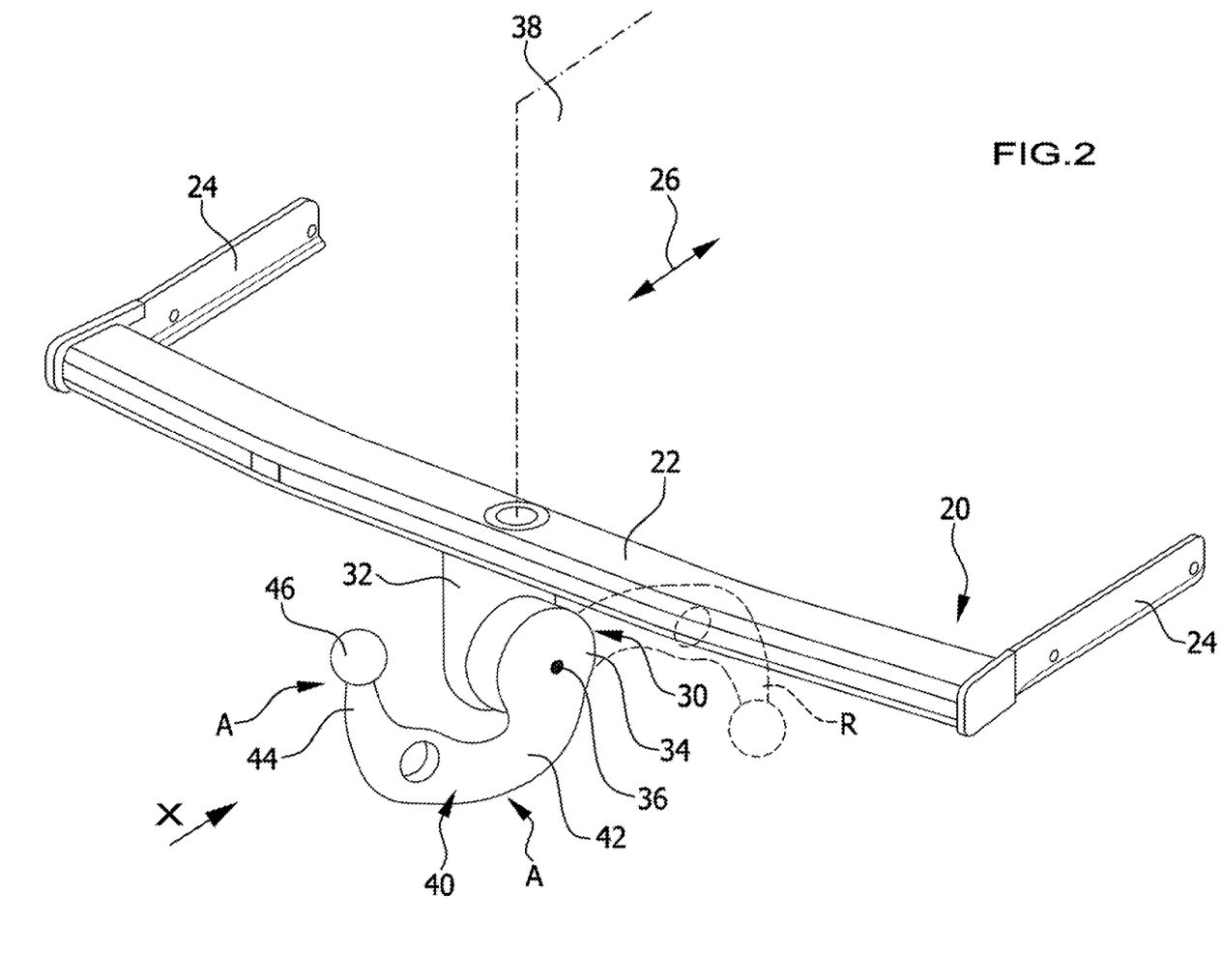
FIG. 2 is an illustration of an embodiment of a carrier unit according to the invention.

Further, the carrier unit 20 is provided with a bearing unit that is designated 30 as a whole and the bearing base 32 of which is connected to the transverse carrier 22, as illustrated in FIG. 2.

Further, the bearing unit 30 comprises a bearing element that is designated 34 as a whole and is connected to a first end 42 of a coupling element, which is designated 40 as a whole and which the carrier unit 20 likewise comprises, and which in particular takes the form of a ball neck that extends from the first end 42 to a second end 44 and carries at its second end 44 a coupling ball that is designated 46 as a whole.

The bearing element 34 may be a bearing element that is fixedly connected to the bearing base 32 or that is removably mountable on the bearing base.

As an alternative, however, in the solution illustrated in FIG. 2, the bearing element 34 may be a pivotal bearing element that is pivotal about a pivot axis designated 36 in relation to the bearing base 32, such that the coupling element 40 is pivotal from the operative position A illustrated in FIG. 2 by solid lines into a rest position R, which is illustrated by dashed lines and in which the ball neck 40 extends from the bearing base 32 transversely in relation to the longitudinal direction 26 of the motor vehicle body 12 and hence in particular longitudinally in relation to the transverse carrier 22.

As a result, in the rest position R illustrated by dashed lines, the coupling element 40 runs transversely in relation to a vertical longitudinal center plane 38 of the motor vehicle body 12 and also in relation to the coupling carrier unit 20, with the vertical longitudinal center plane 38 thus also running parallel to the longitudinal direction 26.

Further, the pivot axis 36 also runs preferably transversely to the longitudinal center plane 38 but inclined about an angle in relation to the vertical longitudinal center plane, wherein the angle is for example less than 70° or in particular more than 20°.

Figure 3:
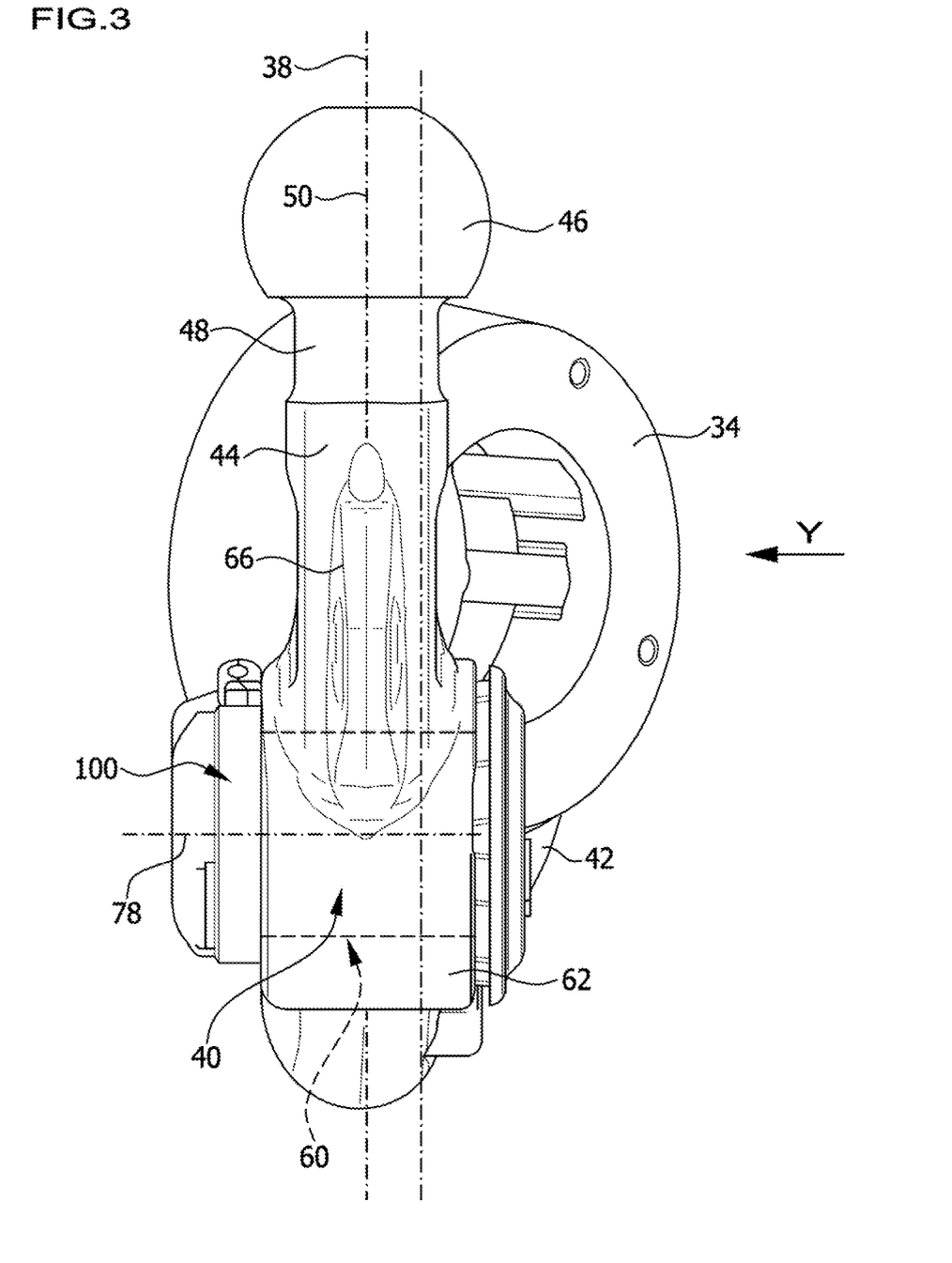
FIG. 3 shows a view of a ball neck of the carrier unit, in the direction of the arrow X in FIG. 2.

An exemplary embodiment of a ball neck 40 of this kind is illustrated on a larger scale in FIG. 3, wherein the coupling element 40 is in particular integrally formed on the bearing element 34 and the bearing element 34 in this case takes the form of a pivotal bearing element for pivotal bearing on the bearing base 32.

In the illustrated exemplary embodiment of the coupling element 40, it carries in particular at its second end 44 a ball attachment 48, which has an outer face that runs cylindrically in relation to a ball center axis, at a radial spacing around a ball center axis that is smaller than the radius of the coupling ball 46.

In the illustrated exemplary embodiment of the coupling element 40, it has, as illustrated in FIGS. 3 to 6, a receiving region 60 that is integrated in one piece with the ball neck 40, that preferably takes the form of an annular body and that lies between a first portion 64 extending from the first end 42 of the ball neck 40 to the annular body 62 and a second portion 66 extending from the annular body 62 to the second end 44 of the coupling element 40.

The annular body 62 surrounds a receptacle that is designated 72 as a whole and extends, for example in the form of a through opening, from a first end face 74 of the annular body 62 to a second end face 76 of the annular body 62 and forms for example a center axis 78 which runs transversely in relation to the longitudinal center plane 38 and may be inclined, for example in relation to a normal to the longitudinal center plane 38, by an acute angle, for example in the range from 5° to 30°.

Figure 5:
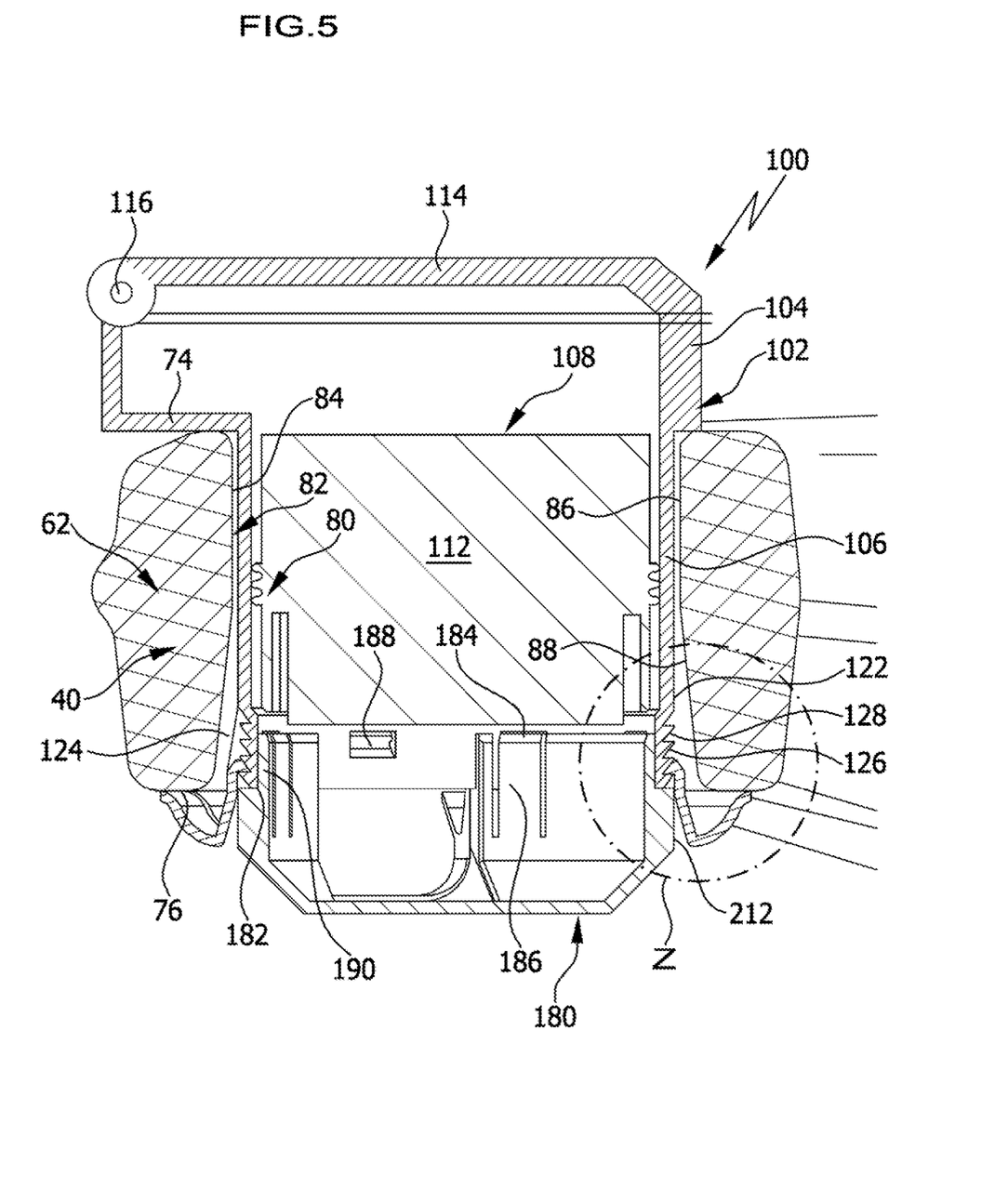
FIG. 5 shows a section along the line 5-5 in FIG. 4.
Figure 6:
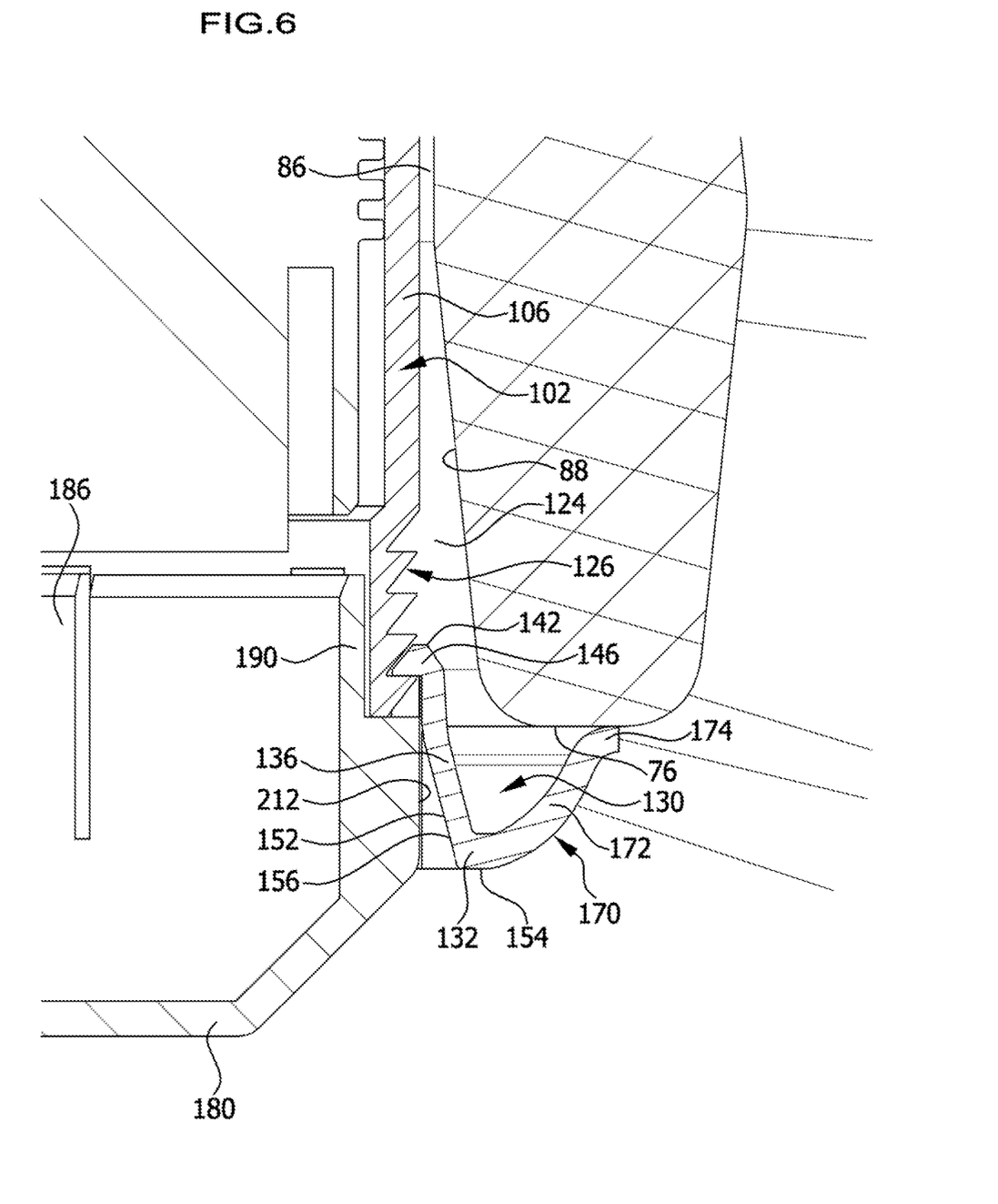
FIG. 6 is an enlarged illustration of the region Z in FIG. 5.

The receptacle 72 is formed in particular by a a receiving channel 82, an inner wall 84 that has, adjoining the first outer side 74 of the receiving region 60, a wall region 86 that runs substantially cylindrically in relation to the center axis 78 and around the center axis 78, and a wall region 88 that starts from the wall region 86 and widens conically as far as the second end face 76 and thus runs at a greater radial spacing from the center axis 78 in the transition to the second outer side 76 of the receiving region than close to the cylindrical wall region 84.

Received in the receptacle 72 is an installation unit that is designated 100 as a whole and is provided with a housing 102 having a first housing portion 104 that abuts against the first outer side 74 and is in particular supported thereby.

A second housing portion 106 extends from the first housing portion 104 and through the receiving channel 82 as far as the second outer side 76.

Preferably here, the second housing portion 106 is integrally formed in one piece with the first housing portion 104 such that they surround a housing interior 108 in which there is arranged for example a plug connector element 112 or indeed an electrical circuit, where appropriate also having sensors.

The housing interior 108 is made accessible for example by a cover 114 that closes off the first housing portion 104 and is pivotal by means of a hinge 116 in relation to the first housing portion 104 and is arranged on the first housing portion 104, on an opposite side to the second housing portion 106.

For example, in this case the second housing portion 106 takes a form such that it abuts at least against the cylindrical wall region 86 of the receiving channel but is prolonged in the direction of the widening wall region 88 such that there is between an outer side 122 of the second housing portion 106 and the wall region 88 a free space 124 in which for example there are arranged latching elements 126, in particular latching indentations, that are integrally formed on the outer side 122, wherein the latching indentations in particular take the form of indentations, preferably grooves, that run completely around the second housing portion 106 on its outer side 122.

For the purpose of fixing the housing 102 of the installation unit 100 to the receptacle 80, there is provided a mounting body that is designated 130 as a whole and has a base body 132, which takes a form such that it surrounds the second housing portion 106 in the region of the free space 124, wherein there are provided on the base body 132 latching element carriers 136 that are kept apart from the base body 132 by recesses 134 on either side relative to the base body 132 and that take the form for example of tongues and, at a first end 138, merge in one piece with the base body 132 and, at a second end 142, carry second latching elements 146, for example taking the form of latching hooks that are able to engage with the first latching elements 126, which for example take the form of latching indentations.

In this arrangement, the latching element carriers 136 take a form such that they are resiliently movable, with the result that it is possible to move the second latching elements 146 away from the first latching elements 126 and in particular beyond them, in opposition to the resilient force action of the latching element carriers 136, in order to make or release a latching connection between the first latching elements 126 and the second latching elements 146.

Preferably, for this purpose the second latching elements 146 are provided with approach ramps 148 that cooperate with corresponding approach ramps 128 of the first latching elements 126 in order to bring the second latching elements 146 into a position in which they are able to make the intended latching connection at least with one of the first latching elements 126.

In this case the latching connection is maintained by the latching element carriers 136, which which at one end are supported against the base body 132 and which urge the second latching elements 142 that are at the other end such that these remain in stable engagement with the first latching elements 126, without any additional action thereon.

So that the latching connection between the first latching elements 126 and the second latching elements 146 can be released in a simple manner, the latching element carriers 136 are provided, as likewise illustrated in FIG. 6, with pressure faces 152 that widen conically in the region of the latching element carriers 136 in the direction from the second end 142 to the first end 138 and preferably extend into the base body 132, as a prolongation of the first end 138 of the latching element carriers 136, and in so doing extend as far as an end face of the mounting body 130 that runs at the opposite end to the latching elements 146, such that the pressure faces 152 form recesses 156 that run from the end face 154 through the base body 132 as far as the latching element carriers 136 and are offset radially outward in relation to an inner face 158 of the base body 132 and are accessible by way of access openings 162 in the end face 154, from the end face 154 side of the base body 132.

Figure 7:
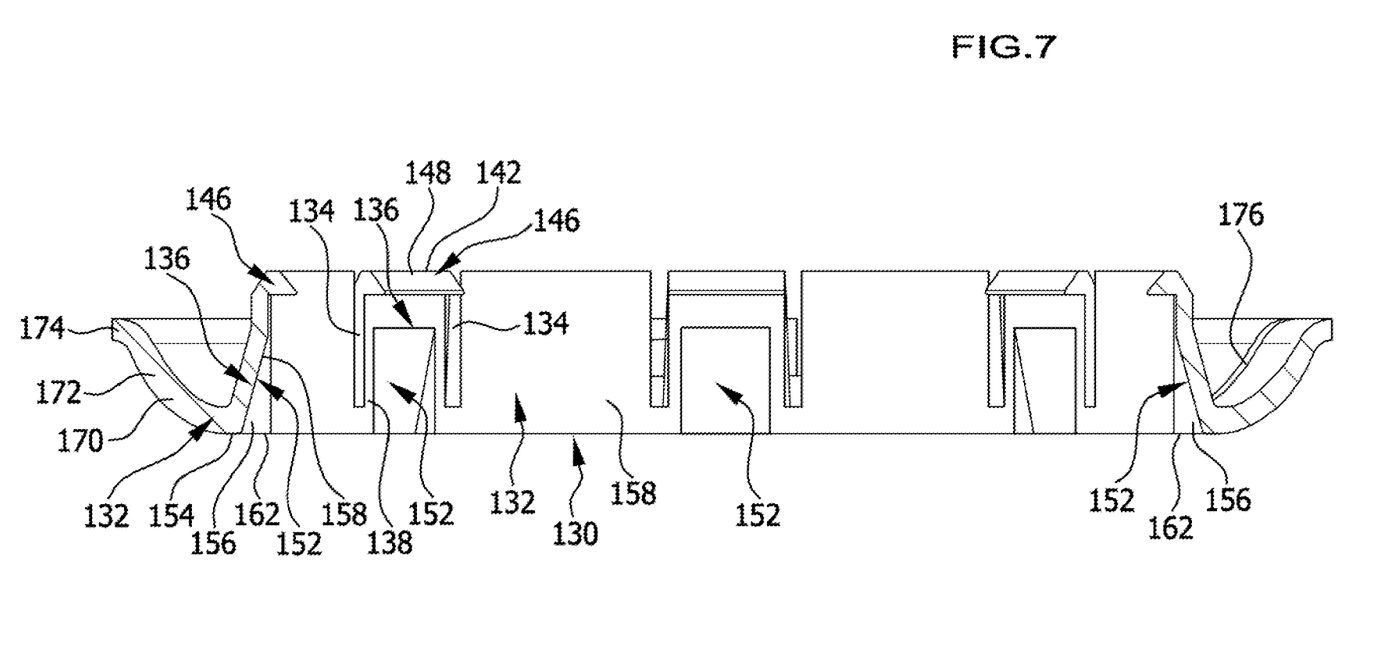
FIG. 7 shows an enlarged section similar to FIG. 5, through a mounting body.
Figure 8:
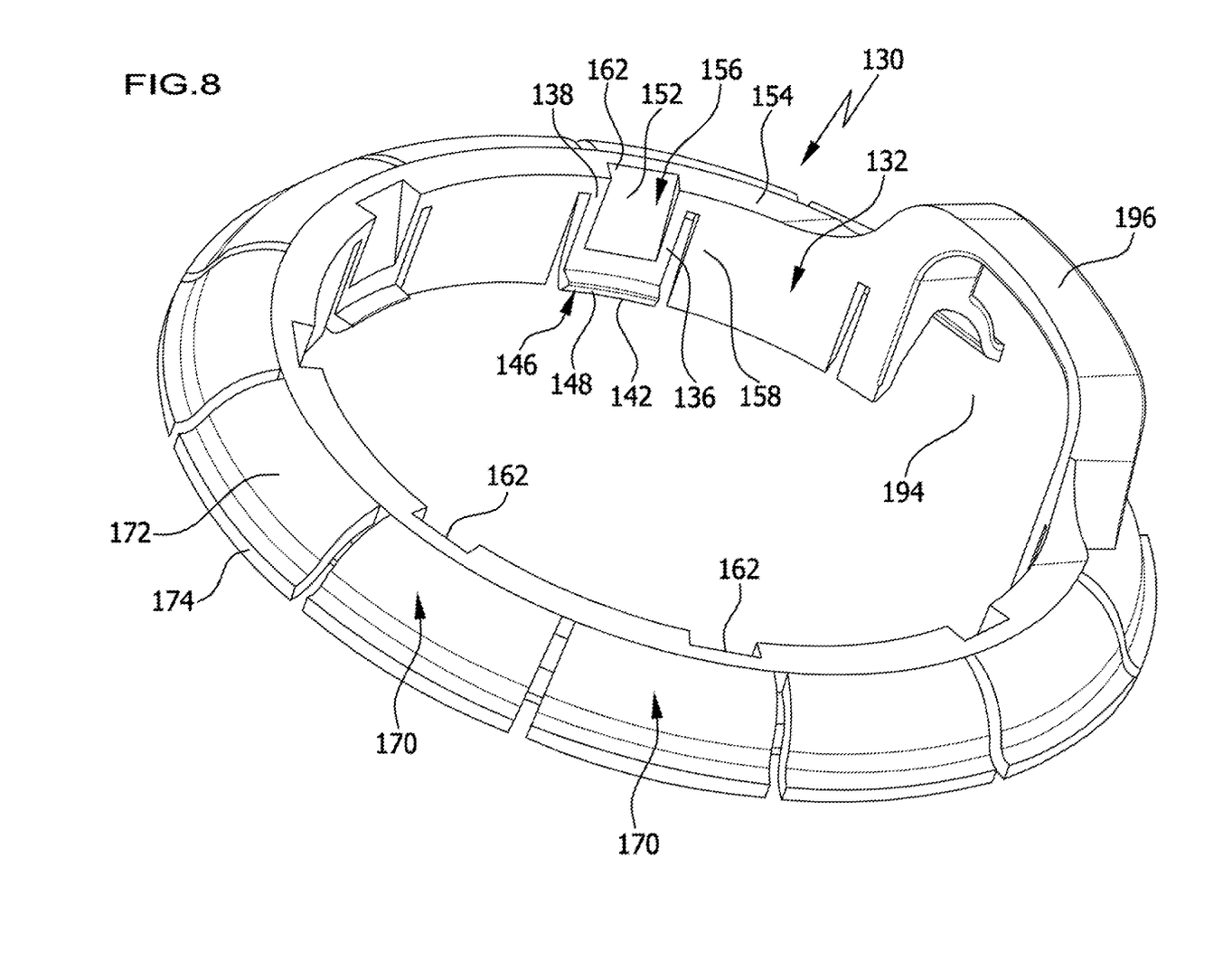
FIG. 8 is a perspective illustration of the mounting body in FIG. 7.

Moreover, the mounting body 130 also comprises support elements 170 that extend from the base body 132, extending from the base body 132 in the direction of the second outer side 76 of the receiving region 60 and preferably having supporting foot carriers 172 that, starting from the base body 132 in the region of the end face 154, extend in the direction of the second outer side 76, radially outside the latching element carriers 136, and carry supporting feet 174 by means of which the support elements 170 are supported against the second outer side 76.

The the support elements 170, in particular the supporting foot carriers 172, take a resiliently deformable form such that it is possible with these to adapt to installation tolerances of the receiving region 60 and the housing 102 of the installation unit 100, and at the same time, because of their resilience, these additionally ensure that as a result of the resiliently deformed support elements 170 the housing 102 of the installation unit 100 undergo a force action that keeps the first housing portion 102 abutting against the first outer face 74 under force load.

Figure 4:
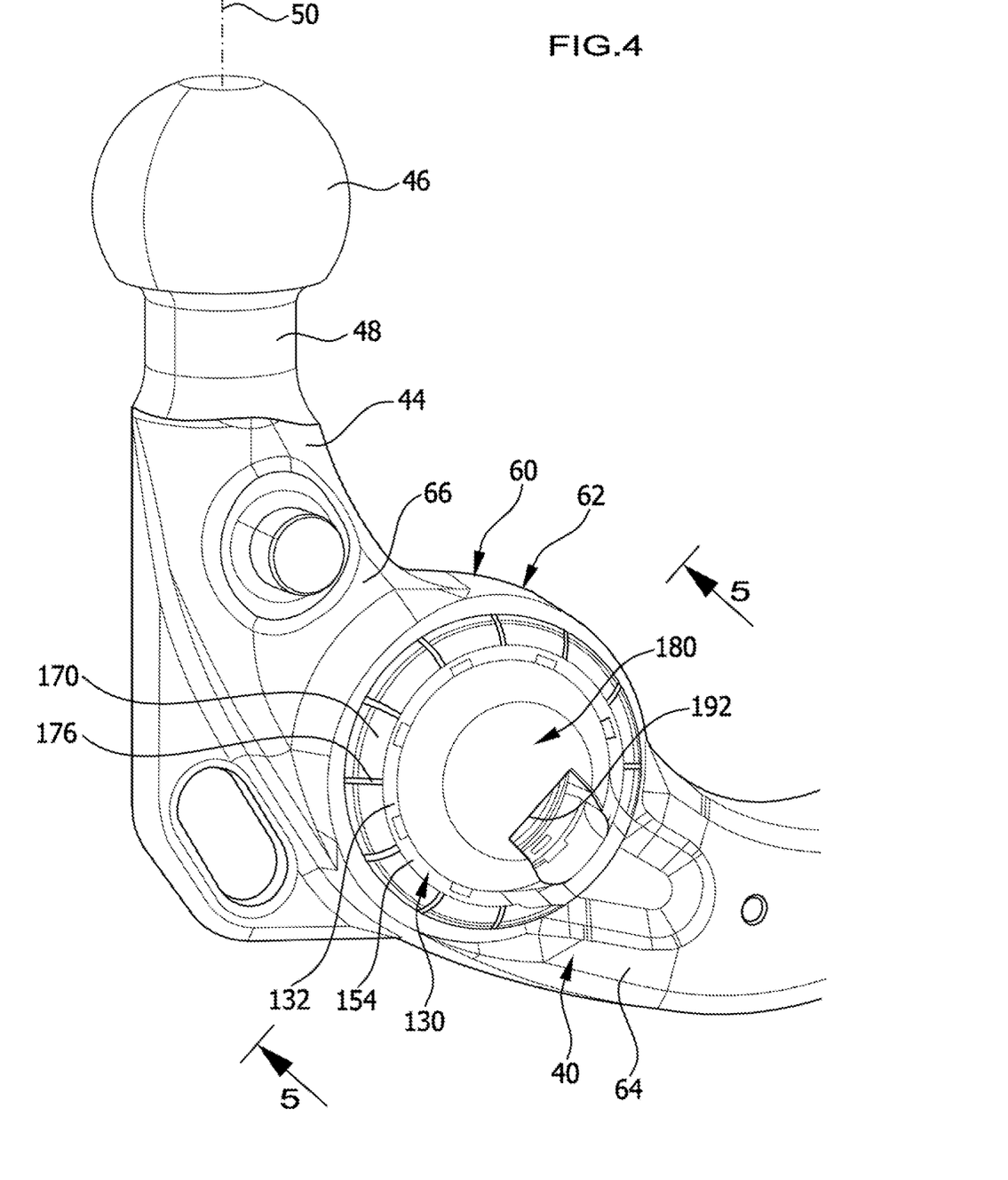
FIG. 4 shows a side view of the ball neck, with an installation unit according to the invention.

As illustrated in FIG. 4, the mounting body 130 comprises support elements 170 that are held successively on the base body 132 in a peripheral direction around the second housing portion 106 and are divided by intermediate spaces 176 into arc segments, for example arc segments of less than 45°, preferably less than 30°, such that this further improves the adaptability of the support elements 170 to dimensional tolerances of the receiving region 60 because the individual support elements 170 in the form of arc segments are able to deform in the most diverse ways and thus to adapt to the most diverse dimensional tolerances over the most diverse range.

In particular in the solution according to the invention, the mounting body 130 is mounted in that it is pushed onto the region of the second housing portion 106 the first latching elements 126 such that the second latching elements 146 slide away over the first latching elements 126 of the second housing portion 106, wherein the mounting body 130 can be pushed onto the second housing portion 106 until a sufficiently large deformation of the support elements 170 has been achieved by pressing the supporting feet 174 thereof against the second outer side 76, and thus the resilient deformation of the support elements 170 exerts a force that keeps the first housing portion 104 abutting against the first side face 74 of the receiving region 60 under force load.

In the first exemplary embodiment, as illustrated in FIG. 4 and FIG. 5, the second housing portion 106 is closed on its side remote from the first housing portion 104 by a cover 180 that engages in an access opening 182 in the second housing portion 106 and is itself fixed to the second housing portion 106, likewise by means of latching tongues 186 carrying latching elements 184, in that the latching elements 184 engage in latching recesses 188 in the second housing portion 106.

In particular, the latching elements 184 are held on a centering body 190 of the cover 180, by means of which the cover 180 engages in the second housing portion 106 through the access opening 182.

Further, the cover 180 is also provided with an infeed line opening 192 through which infeed lines can be introduced into the housing interior 108, for example for the plug connector element 112.

In particular, the mounting body 130 similarly does not have support elements 170 that are arranged to succeed one another in a manner running completely around, but rather the arrangement of the support elements 170 is interrupted in a sub-portion for the purpose of forming a feed-through 194 for infeed lines, wherein a bridge 196 of the base body 132 engages over the feed-through 194 in the mounting body 130 such that the base body 132 as a whole takes the form of a structure running completely around the second housing portion 106 and thus has sufficient stability.

Figure 9:
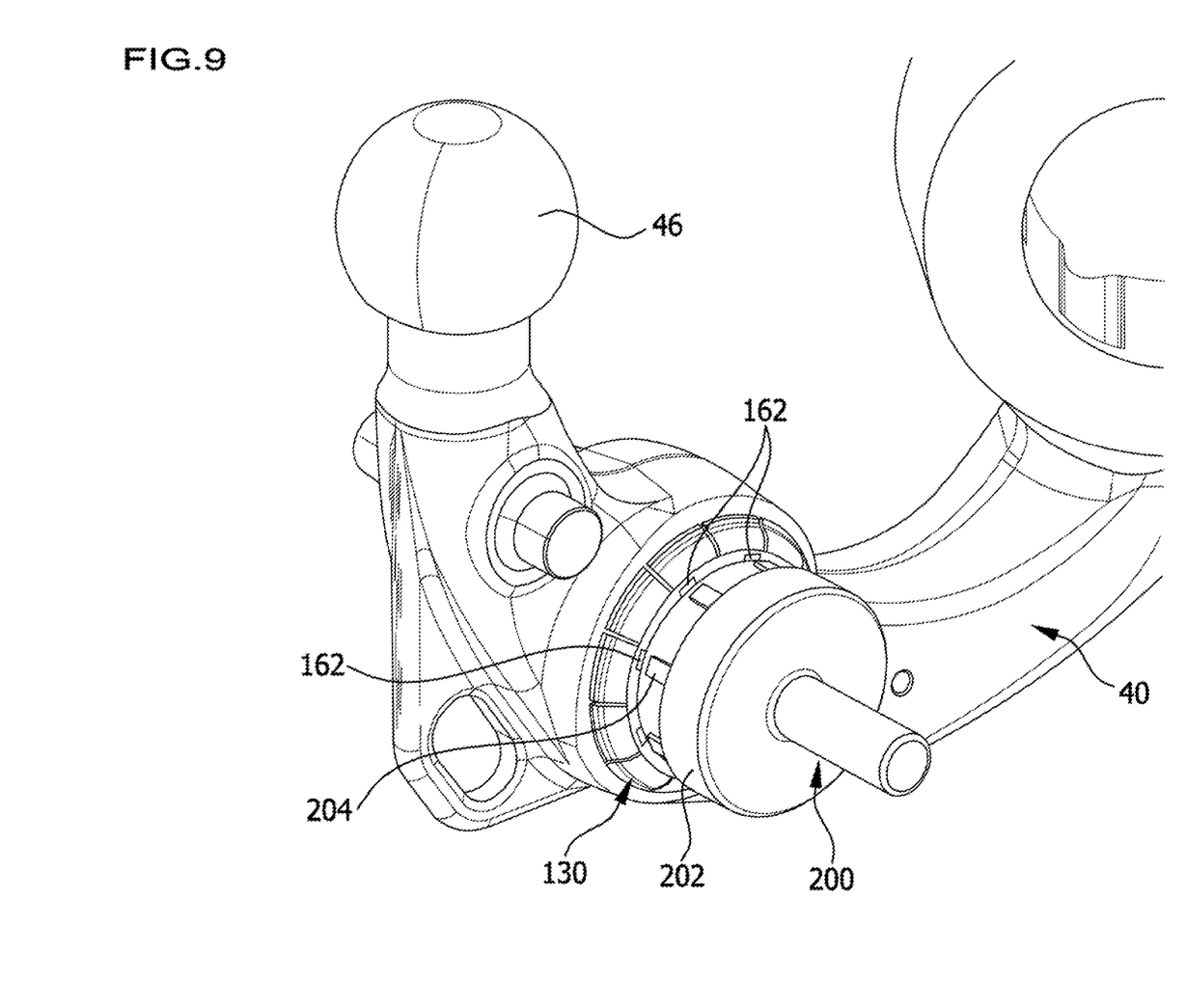
FIG. 9 shows a view similar to FIG. 4, during attachment of the release tool according to the invention.
Figure 10:
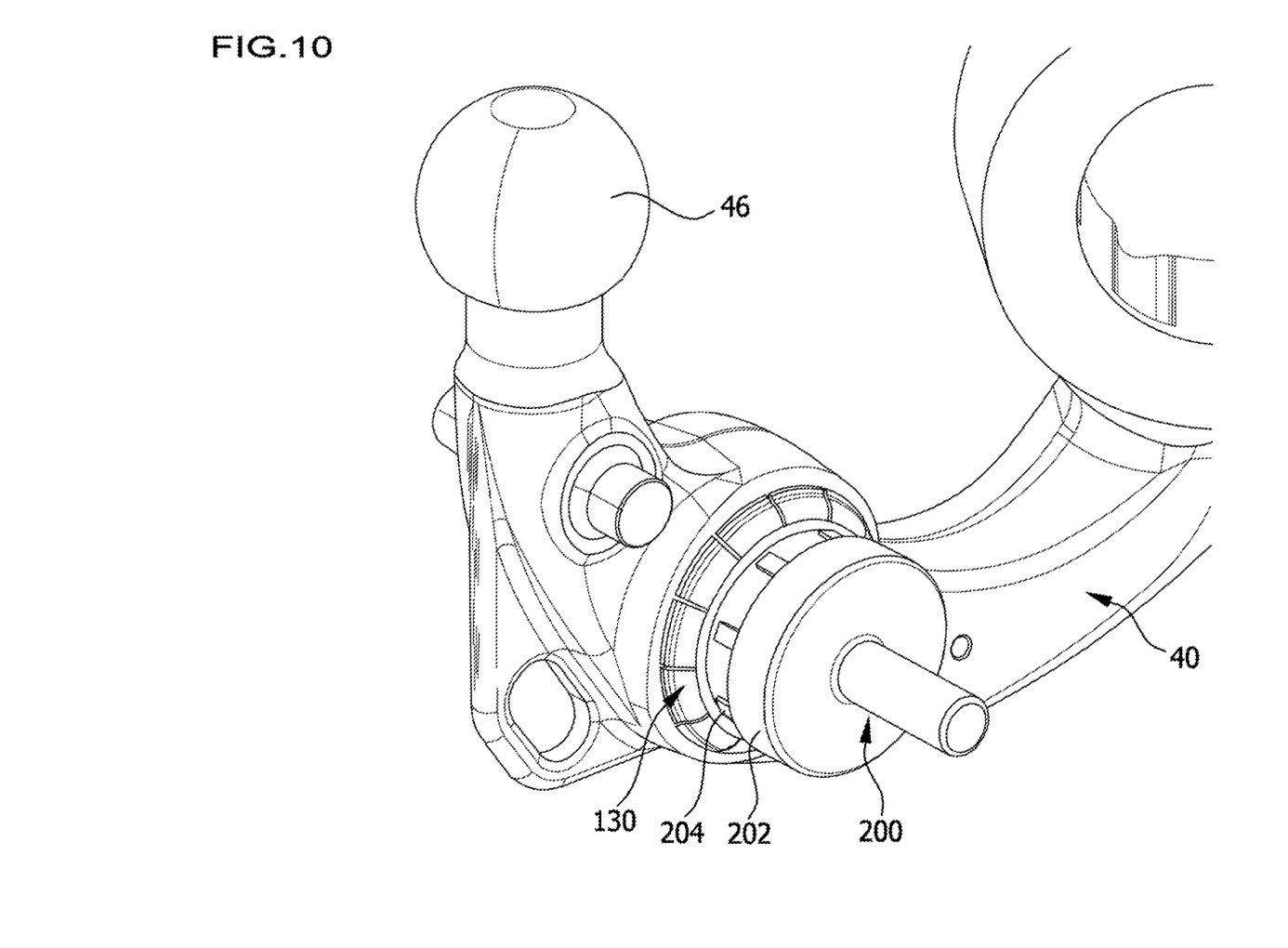
FIG. 10 shows a view similar to FIG. 9, with the release tool active.
Figure 11:
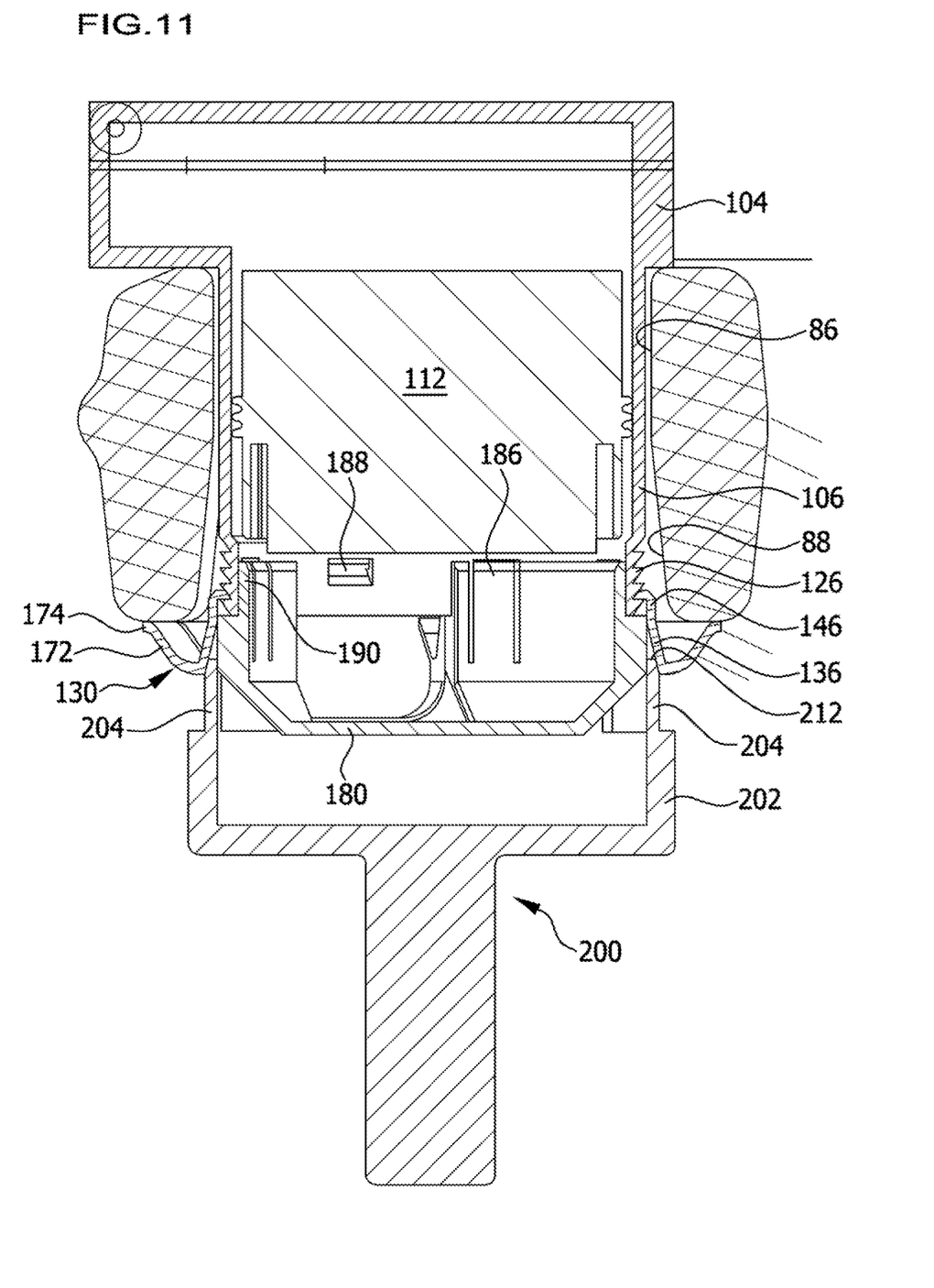
FIG. 11 shows a section similar to FIG. 5, together with an illustration of an action of the release tool having the release fingers.

So that fixing of the mounting body 130 to the second housing portion 106 can be released, there is provided, as illustrated in FIGS. 9 to 11, a release tool that is designated 200 as a whole and has a carrying body 202 on which there are arranged release fingers 204, wherein the release fingers 204 take a form and are dimensioned such that they can be pushed through the access openings 162 and into the recesses 156 and in so doing act by means of end faces 206 on the pressure faces 152 of the latching element carriers 136 in order to deform the latching element carriers 136 in opposition to their resilient force action on the second latching elements 146 in such a way that the second latching elements 146 are disengaged from the first latching elements 126, in order to release latching of the mounting body 130 to the second housing portion 106 and thus to enable the housing 100 to be removed from the receptacle 80.

In particular here, the cover 180 takes a form such that the base body 132 abuts by means of its inner faces 158 against an outer side 212 of the cover 180 and is thus also oriented such that it is centered in relation to the housing 102 by the cover 180, which is centered in relation to the second housing portion 106 by means of the centering body 190.

Figure 12:
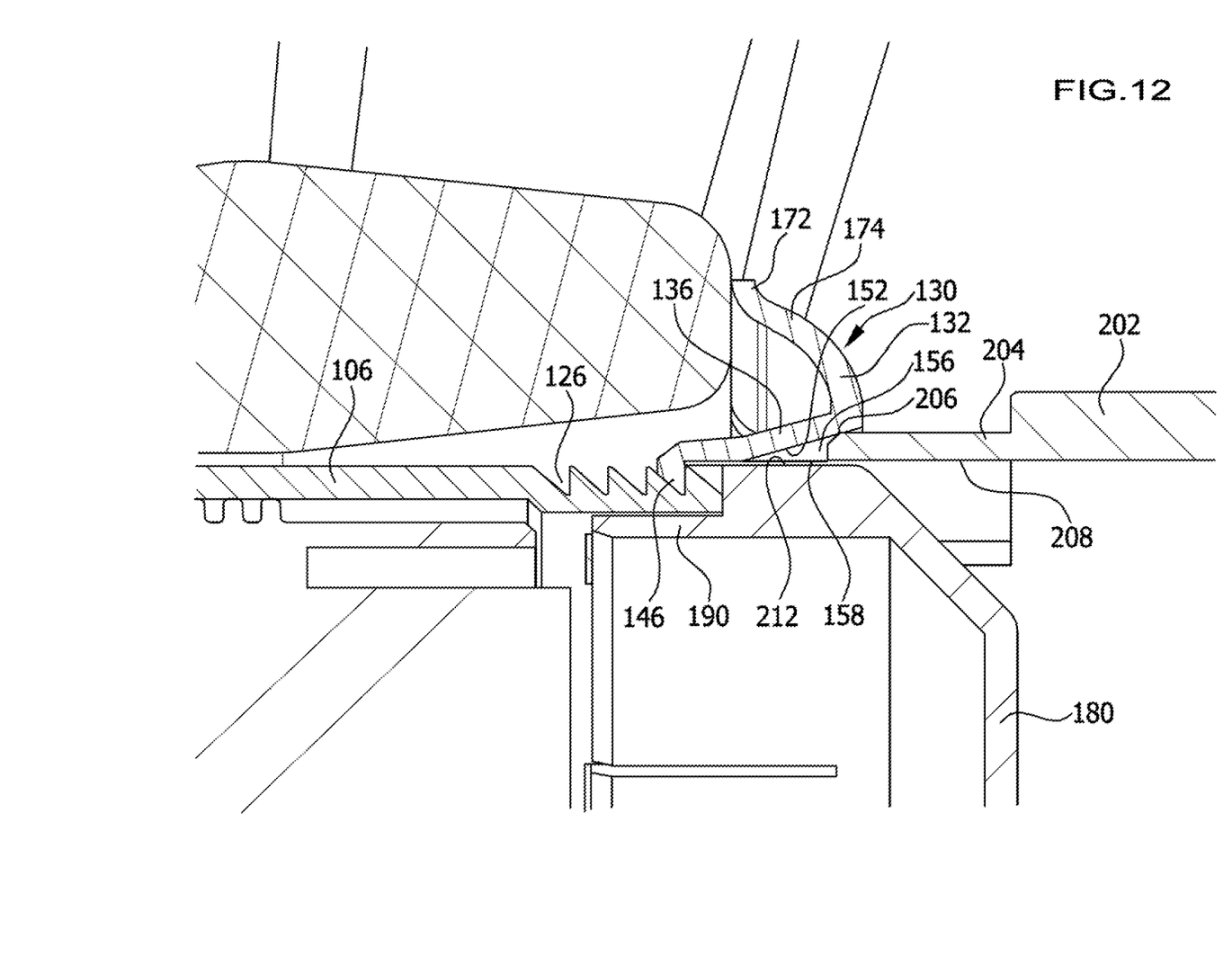
FIG. 12 shows a section similar to FIG. 6, with an illustration of the action of the release fingers on the latching element carriers.

Further, the outer face 212 of the cover 180 serves to enable an inner face 208 of the respective release fingers 204 to be supported against it when it acts on the respective latching element carrier 136 in order to deform this such that the respective second latching element 146 moves to such an extent that it disengages from the respective first latching element 126.

In particular, the release tool 200 takes a form such that the number of release fingers 204 corresponds to the number of access openings 162 in the mounting body 130, with the result that attaching the release tool 200 once enables it to act by means of all the release fingers 204 on all the latching element carriers 136 at the same time, in order to disengage all the second latching elements 146 from the corresponding first latching elements 126 on the second housing portion 106 and in this way to enable the mounting body 130 to be released from the second housing portion 106.

The invention claimed is:

1. An installation unit for a carrier unit that is mounted on a body of a motor vehicle, comprising a housing having a first housing portion that is supported on one side of the carrier unit, a second housing portion that passes through a receptacle in the carrier unit, and a mounting body that is opposite the first housing portion and is supported on the carrier unit on a side remote from the first housing portion and, when the installation unit is mounted on the carrier unit, is fixed to the second housing portion by first latching elements arranged on the second housing portion and second latching elements arranged on the mounting body, wherein the mounting body has a base body to which the second latching elements are connected, and the mounting body cooperates with support elements that are supported against the carrier unit, the second latching elements are connected to the base body by latching element carriers, and the latching element carriers have, on a side facing the second housing portion, pressure faces by way of which the latching element carriers are configured to be urged such that the second latching elements are disengaged from the first latching elements provided on the second housing portion.

2. The installation unit as claimed in claim 1, wherein, as the pressure faces extend in the direction of the second latching elements, they extend on the latching element carriers from their ends facing the base body increasingly in the direction of the first latching elements of the second housing portion.

3. The installation unit as claimed in claim 2, wherein the pressure faces delimit a recess formed in the respective latching element carrier.

4. The installation unit as claimed in claim 1, wherein the pressure faces are accessible from the base body side by way of access openings provided in the base body.

5. The installation unit as claimed in claim 4, wherein the respective recesses are accessible by way of the access openings.

6. The installation unit as claimed in claim 1, wherein, for the purpose of releasing the latching connection, the pressure faces of the latching element carriers are urged by release fingers acting on the pressure faces such that the latching element carriers move the second latching elements into a release position that is no longer latched to the first latching elements.

7. The installation unit as claimed in claim 6, wherein the release fingers are introduced into the recesses through the access openings.

8. The installation unit as claimed in claim 1, wherein the pressure faces are urged by release fingers arranged on a release tool, for the purpose of releasing the latching connection.

9. The installation unit as claimed in claim 8, wherein the number of release fingers on the release tool corresponds to the number of latching element carriers provided with pressure faces.

10. The installation unit as claimed in claim 1, wherein the second latching elements take the form of latching hooks or latching indentations that cooperate with first latching elements that are arranged on the second housing portion and take the form of latching indentations or latching hooks.

11. The installation unit as claimed in claim 1, wherein the latching element carriers connect the latching elements to the base body in a resiliently movable manner.

12. The installation unit as claimed in claim 11, wherein the latching element carriers urge the second latching elements such that these are held in engagement with the first latching elements as a result of the resilient force action of the latching element carriers when the latching connection is active.

13. The installation unit as claimed in claim 1, wherein the base body is a body that runs completely around a center axis of the second housing portion.

14. The installation unit as claimed in claim 13, wherein the base body takes the form, at least in part, of an annular body, of which the annular body ends are connected to one another by a bridge.

15. The installation unit as claimed in claim 13, wherein the bridge forms a feed-through for a line that leads into the second housing segment.

16. The installation unit as claimed in claim 1, wherein the mounting unit is supported against an opposite side of the carrier unit to the first housing portion by means of the support elements.

17. The installation unit as claimed in claim 16, wherein the support elements are supported against a side face of the carrier unit outside the receptacle.

18. The installation unit as claimed in claim 1, wherein the support elements have supporting feet that are connected to the base body by means of resiliently deformable supporting foot carriers.

19. The installation unit as claimed in claim 18, wherein the supporting foot carriers extend in an arc shape from the base body to the supporting feet.

20. The installation unit as claimed in claim 18, wherein the support elements take a form such that they are arranged to succeed one another in a plane running parallel to the side face provided on the carrier unit but are formed to be resiliently movable in relation to one another.

21. The installation unit as claimed in claim 20, wherein the support elements take the form of arc segments arranged to succeed one another in the plane parallel to the side face.

22. The installation unit as claimed in claim 1, wherein an electrical line is introduced into the second housing portion from the side thereof remote from the first housing portion.

23. The installation unit as claimed in claim 1, wherein the second housing portion is closed on its side remote from the first housing portion by a cover.

24. The installation unit as claimed in claim 23, wherein the cover and the mounting unit are separate parts.

25. The installation unit as claimed in claim 24, wherein the cover is fixed to the second housing portion.

26. The installation unit as claimed in claim 25, wherein the mounting unit takes a form surrounding the cover.

27. The installation unit as claimed in claim 1, wherein the cover has an outer face against which the release fingers are supported during action on the pressure faces.

28. The installation unit as claimed in claim 1, wherein the installation unit is formed for the purpose of receiving a plug connector element.

29. The installation unit as claimed in claim 1, wherein the installation unit is formed for the purpose of receiving an electronic circuit.

30. The installation unit as claimed in claim 1, wherein the installation unit is formed for the purpose of receiving sensors.

31. A carrier unit for mounting on a body of a motor vehicle, the carrier unit is provided with an installation unit as claimed in claim 1.

32. The carrier unit as claimed in claim 31, wherein the carrier unit comprises a coupling element for a trailer and/or a coupling element for a load carrier that is provided with the receptacle.

33. The carrier unit as claimed in claim 32, wherein the coupling element extends away from a tail side of the motor vehicle.

34. The carrier unit as claimed in claim 32, wherein the coupling element is provided with the installation unit.

\* \* \* \* \*